Jan. 26, 1937.  M. J. KAPLAN  2,068,648
PIPE COUPLING
Filed Aug. 13, 1935 3 Sheets-Sheet 2

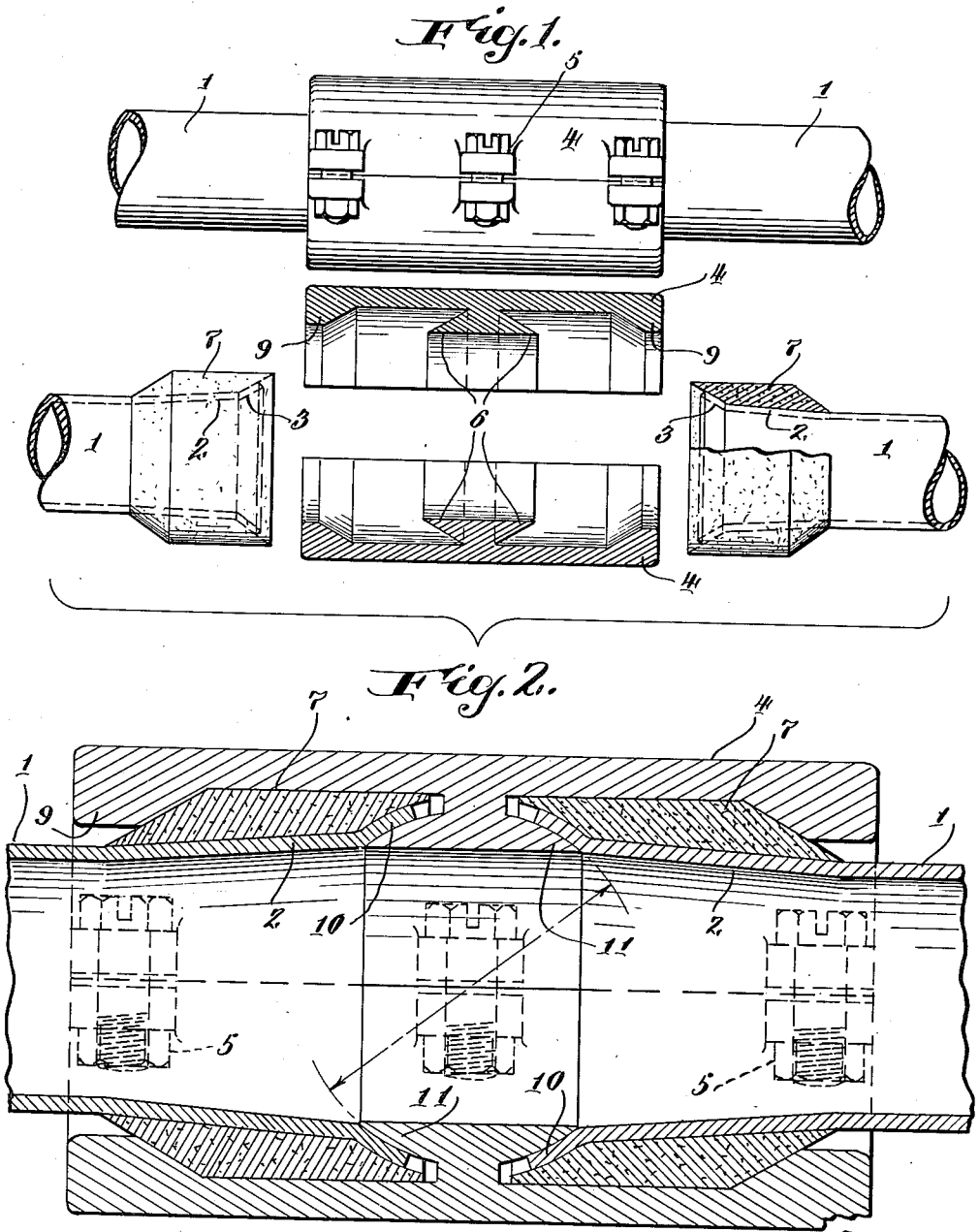

Inventor
Michael J. Kaplan
By Edwin T. Samuels
Attorney

Jan. 26, 1937. M. J. KAPLAN 2,068,648
PIPE COUPLING
Filed Aug. 13, 1935 3 Sheets-Sheet 3

Patented Jan. 26, 1937

2,068,648

UNITED STATES PATENT OFFICE 2,068,648

PIPE COUPLING

Michael J. Kaplan, Atlantic County, N. J.

Application August 13, 1935, Serial No. 35,934

6 Claims. (Cl. 285—194)

My invention relates to a pipe coupling and is particularly useful with light ductile pipe, though not limited thereto, which is used in relatively small diameters and which may be subjected to vibration and even some bending.

Some pipes, such as aluminum, when put together by threaded couplings, can hardly be separated thereafter because the threads adhere so tightly together. Also, such rigid connections often cause the pipe to break when subjected to vibration.

The objects of my invention are to make a pipe coupling that will hold the ends fast together, that will not leak, whether gas or liquid are passed therethrough, one that the contents will not corrode or affect adversely, and that the pressure of the contents will not weaken or break, one in which the packing is easily applied and held fast after assembly, and one which will allow considerable resiliency to the pipe and its coupling.

Other objects and advantages of my invention will be apparent from the following description and the accompanying drawings forming a part hereof and in which:

Figure 1 is a side elevation of two pipes joined by my coupling.

Figure 2 is a partial sectional view of the parts shown in Figure 1 prior to assembly.

Figure 3 is a sectional view through a modified form of my invention.

Similar numerals refer to similar parts throughout the several views.

Figure 4:
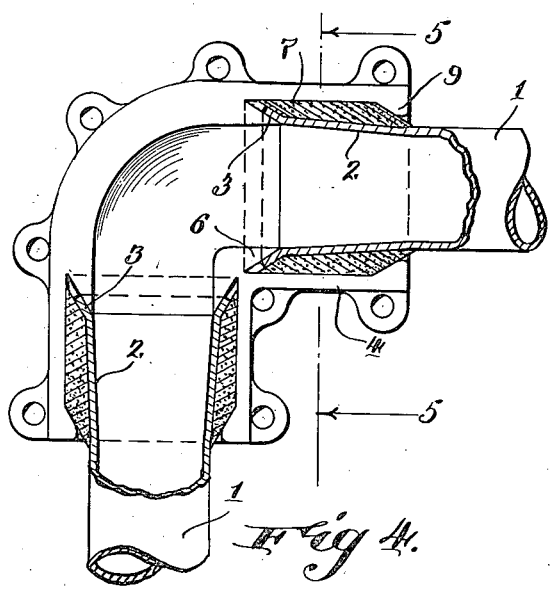
Figure 4 is a partially sectional view of my invention showing the same applied to an elbow.

Pipes 1 have a coned portion 2 adjacent their ends, and at their ends the pipes are flared, as at 3. The coupling casing is shown as arcuate members 4, bolted together by bolts 5. The coupling members have an externally coned flange 6 which exactly fits into the flared end 3 of the pipes. The contacting surfaces are preferably parallel to give a long contact.

Figures 10, 11:
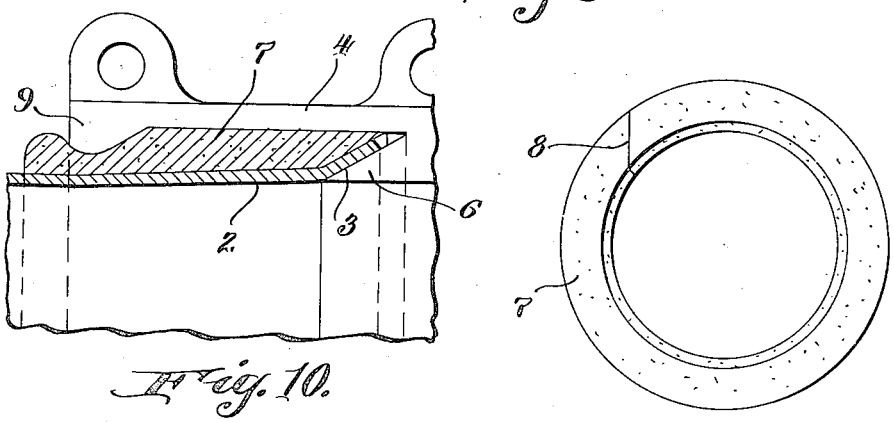
Figure 10 is another modified coupling casing.
Figure 11 is an end elevation of a form of packing member.

A packing member 7 fits in the space between the casing and pipe. This packing member may be elastic rubber, to give elasticity to the joint, and to allow for some bending, or where such elasticity is not required, it may be of any other desired material. The packing preferably extends beyond the end of the pipe and it presses the flared ends 3 of the pipe firmly against the flanges 6 of the casing, thus not only making a tight joint between casing and pipe, but also keeping the contents of the pipe away from the packing, and thus preserving its effectiveness. The packing may be in molded form and split, as at 8 in Figure 11 to allow it to be readily put around the pipe in assembly, or if not split, it may be expanded and pushed over the end of the pipe.

The casings preferably have an internal shoulder 9 adjacent their ends, which serves to hold the packing tightly in place between the casing and pipe. It is preferable that the shoulders should not contact directly with the pipe, and that the packing extend slightly beyond the edge of the shoulder in order to give flexibility to the joint and not injure the pipe. The shoulder may take various forms, as shown in Figures 2, 3, 4, 6, 9 and 10, and in Figures 6 and 10 the packing is shown projecting beyond the casing.

Should more flexibility in the coupling be desired, the flared pipe end may be spherical, and the coned flange on the casing may likewise be spherical, as shown at 10 and 11 in Figure 3. With an elastic packing, this structure will allow a moderate angular movement at both sides of the coupling.

Figure 5:
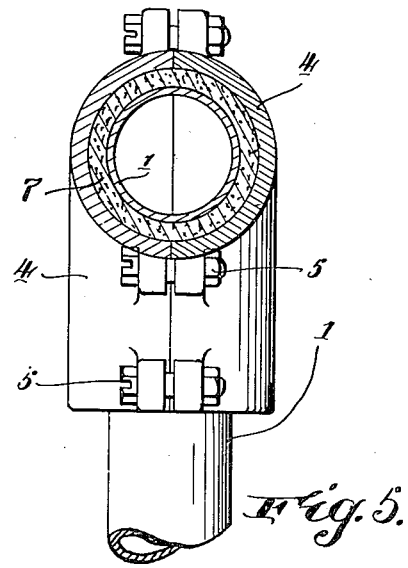
Figure 5 is a sectional view thereof on line 5—5 of Figure 4.
Figure 6:
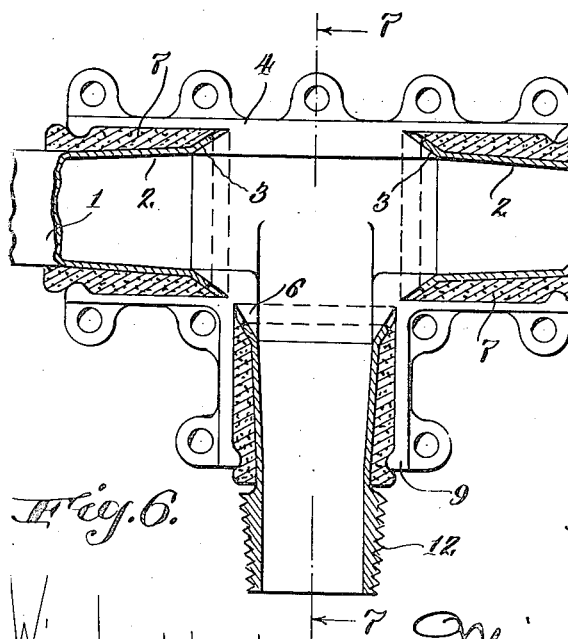
Figure 6 is a partially sectional view of my invention showing the same applied to a T joint.
Figure 7:
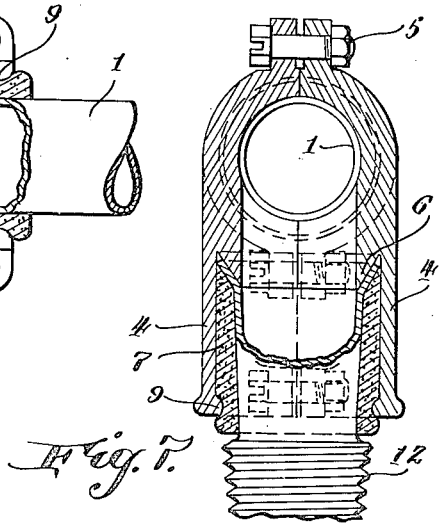
Figure 7 is a sectional view thereof on line 7—7 of Figure 6.
Figure 8:
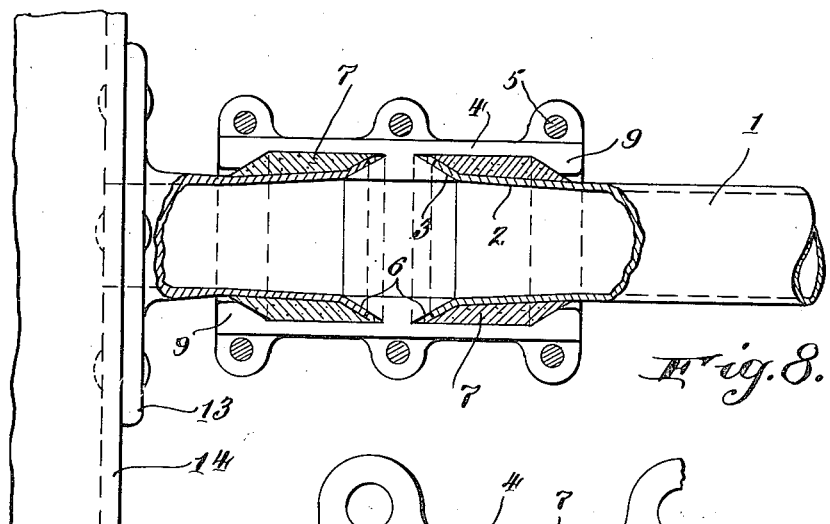
Figure 8 is a partially sectional view of my invention showing the same attached to a tank.
Figure 9:
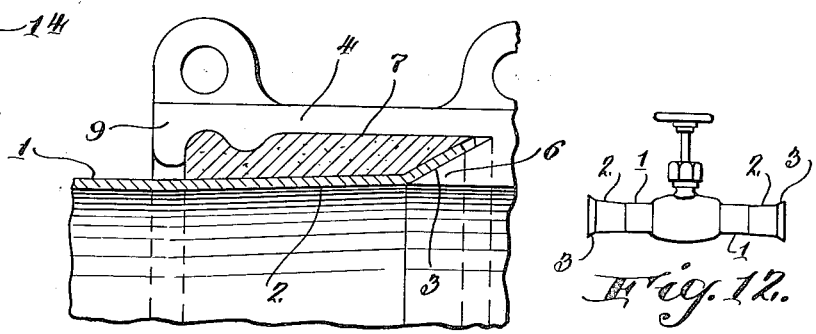
Figure 9 is a fragmentary view of a modified form of coupling casing.
Figure 12:
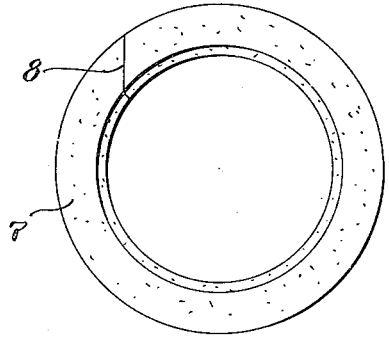
Figure 12 is an elevation of a valve adapted to be coupled with my new coupler.

Figures 4 and 5 show that the invention is equally applicable to an elbow and Figures 6 and 7 show a threaded adapter 12 in the T joint. Figure 8 shows a flanged adapter 13, attached to a fragment of a tank 14, used in my new coupling and Figure 12 shows a valve, both ends of which are shown with portions adapted for use in my new coupling. These are illustrative that my new coupling may be used to attach different pipes and elements together.

This coupling is very useful for aeroplane or dirigible piping, where lightness and flexibility, together with tightness of joints are imperative. The usual universally flexible tubing is quite heavy for such use.

The coupling of the invention is adapted for use as described in making pipe and tube joints for any purpose in setting up pipe or tube lines for the conducting of liquids or gases or to enclose electric wires.

I have thus described my invention in the perferred form and the manner of applying the same, the description being specific and in detail, in order that the manner of operating and using the invention may be fully understood, however the specific terms used herein are used in a descriptive rather than in a limiting sense, the scope of the invention being defined in the claims.

I claim:

1. A pipe coupling comprising a pipe coned adjacent its end and flared at its end, 180° arcuate sectional casing members connected together and surrounding said coned and flared portions and having an internal flange integral with said members fitting snugly into said flared end, packing between said members and coned and flared pipe portions, said packing pressing said flared pipe portion tightly against said internal flange.

2. A pipe coupling according to claim 1, in which the sectional casing members are provided with an integral internal shoulder adjacent the end of said casing members to securely hold said packing in the space between said members and pipe.

3. A pipe coupling comprising a pipe coned adjacent its end and flared at its end, 180° arcuate casing members connected together and surrounding said coned and flared portions and having an externally coned flange part of said flange being integral with each corresponding casing member and said flange fitting into said flared end, packing between said members and coned and flared pipe portions, said packing pressing said flared pipe portion tightly against said coned flange and preventing contact between the end of said members and said pipe.

4. A pipe coupling comprising a pipe coned adjacent its end and spherically flared at its end, 180° arcuate sectional casing members connected together and surrounding said coned and flared portions and having an internal spherical flange in two parts, each part being integral with the corresponding casing member fitting snugly into said spherically flared end, packing between said members and coned and flared pipe portions, said packing pressing said flared pipe portion tightly against said internal flange.

5. A pipe coupling according to claim 4, in which the packing is elastic and the sectional casing members are provided with an internal shoulder adjacent the end of said casing members to securely hold said packing in the space between said members and pipe.

6. A pipe coupling comprising a pipe coned adjacent its end and flared at its end, sectional casing members connected together and surrounding said coned and flared portions and having an internal flange integral with said casing and fitting snugly into said flared end, packing between said members and coned and flared pipe portion fitting tightly against said internal flange, said casing members having an internal shoulder at their respective opposite ends providing a chamber of increased diameter back of said shoulder, the shoulder being of greater internal diameter than the external diameter of the pipe providing for bending and variation of the pipe directions.

MICHAEL J. KAPLAN.